(12) United States Patent
Narabayashi et al.

(10) Patent No.: US 12,458,938 B2
(45) Date of Patent: Nov. 4, 2025

(54) MIXING NOZZLE AND CONTAMINATED GAS PURIFICATION DEVICE USING MIXING NOZZLE

(71) Applicants: TOKYO INSTITUTE OF TECHNOLOGY, Tokyo (JP); RASA INDUSTRIES, LTD., Tokyo (JP); KIMURA CHEMICAL PLANTS CO., LTD., Amagasaki (JP)

(72) Inventors: Tadashi Narabayashi, Tokyo (JP); Hiroshige Kikura, Tokyo (JP); Hideharu Takahashi, Tokyo (JP); Katsumasa Araoka, Tokyo (JP); Koji Endo, Tokyo (JP); Tomohiko Yoshii, Amagasaki (JP)

(73) Assignees: RASA INDUSTRIES, LTD., Tokyo (JP); GX ENERGY LTD., Tokyo (JP); KIMURA CHEMICAL PLANTS CO., LTD., Amagasaki (JP)

( * ) Notice: Subject to any disclaimer, the term of this patent is extended or adjusted under 35 U.S.C. 154(b) by 550 days.

(21) Appl. No.: 17/920,312

(22) PCT Filed: Mar. 26, 2021

(86) PCT No.: PCT/JP2021/012811
§ 371 (c)(1),
(2) Date: Oct. 20, 2022

(87) PCT Pub. No.: WO2021/215191
PCT Pub. Date: Oct. 28, 2021

(65) Prior Publication Data
US 2023/0173440 A1 Jun. 8, 2023

(30) Foreign Application Priority Data
Apr. 21, 2020 (JP) .................. 2020-075710

(51) Int. Cl.
*B01F 25/314* (2022.01)
*A61L 9/14* (2006.01)
(Continued)

(52) U.S. Cl.
CPC ........ *B01F 25/31422* (2022.01); *A61L 9/145* (2013.01); *A61L 9/22* (2013.01);
(Continued)

(58) Field of Classification Search
CPC .......... B01F 25/31243; B01F 25/31252; B01F 2025/911; B01F 2025/917;
(Continued)

(56) References Cited

U.S. PATENT DOCUMENTS 1,087,242 A * 2/1914 Kelly ...................... F24H 9/133
122/412
1,678,225 A * 7/1928 Kincade .............. B01F 25/3121
366/338
(Continued)

FOREIGN PATENT DOCUMENTS

FR       2355554 A1 *  1/1978
JP       S59-142058 U   9/1984
(Continued)

OTHER PUBLICATIONS

Written Opinion, Form 237 in related PCT/JP2021/012811, dated Apr. 20, 2021.*
(Continued)

*Primary Examiner* — Charles Cooley
(74) *Attorney, Agent, or Firm* — MCGINN I.P. LAW GROUP, PLLC

(57) ABSTRACT

The mixing nozzle has a throat section, a diffuser section, a gas nozzle section, a first liquid suction port, a liquid nozzle section, a second liquid suction port, a baffle plate, and a jetting port. The first liquid suction port liquidly absorbs the
(Continued)

solution in the water storage pool from a side of the gas nozzle section toward the gas nozzle tip. The liquid nozzle section extends to the downstream side of the gas nozzle section with intervening the first liquid suction port. The second liquid suction port liquidly absorbs the solution in the water storage pool from a side of the liquid nozzle section toward the liquid nozzle tip. The baffle plate is provided such that the mixed flow mixed in the diffuser section collides in front of a downstream end of the diffuser section, and divides and reverses the mixed flow.

21 Claims, 5 Drawing Sheets

(51) Int. Cl.

| | | |
|---|---|---|
| | *A61L 9/22* | (2006.01) |
| | *A61L 101/02* | (2006.01) |
| | *A62B 23/02* | (2006.01) |
| | *B01D 39/20* | (2006.01) |
| | *B01D 45/08* | (2006.01) |
| | *B01D 53/04* | (2006.01) |
| | *B01D 53/14* | (2006.01) |
| | *B01D 53/18* | (2006.01) |
| | *B01D 53/86* | (2006.01) |
| | *B01F 23/231* | (2022.01) |
| | *B01F 25/312* | (2022.01) |
| | *B01F 101/00* | (2022.01) |
| | *G21F 9/02* | (2006.01) |

(52) U.S. Cl.
CPC ..... *B01D 39/2017* (2013.01); *B01D 39/2041* (2013.01); *B01D 45/08* (2013.01); *B01D 53/04* (2013.01); *B01D 53/1493* (2013.01); *B01D 53/185* (2013.01); *B01D 53/8687* (2013.01); *B01F 23/23121* (2022.01); *B01F 25/31233* (2022.01); *G21F 9/02* (2013.01); *A61L 2101/02* (2020.08); *A61L 2209/134* (2013.01); *A61L 2209/14* (2013.01); *A62B 23/02* (2013.01); *B01D 2252/103* (2013.01); *B01D 2253/108* (2013.01); *B01D 2257/202* (2013.01); *B01D 2257/80* (2013.01); *B01D 2259/4541* (2013.01); *B01D 2259/4566* (2013.01); *B01F 2101/2204* (2022.01)

(58) Field of Classification Search
CPC ...... B01F 25/312521; B01F 25/312533; B01F 25/32; B01F 25/31242; B01F 2025/9171; B01F 25/312531; B01F 25/31422; B01F 23/23121; B01F 2101/2204; B01F 23/232; B01F 23/23761; B01F 23/23762; B01F 25/25; B01F 25/31251; B01F 23/2326; F16L 27/0812; A61L 9/145; A61L 9/22; A61L 2101/02; A61L 2209/134; A61L 2209/14; A61L 2209/10; A61L 2209/111; A61L 2209/16; B01D 39/2017; B01D 39/2041; B01D 45/08; B01D 53/04; B01D 53/1493; B01D 53/185; B01D 53/8687; B01D 2252/103; B01D 2253/108; B01D 2257/202; B01D 2257/80; B01D 2259/4541; B01D 2259/4566; B01D 53/62; B01D 53/72; B01D 53/84; B01D 53/8668; B01D 2251/102; B01D 2251/304; B01D 2251/95; B01D 2257/504; B01D 2257/7025; B01D 2257/708; B01D 2257/91; B01D 53/18; G21F 9/02; A62B 23/02
USPC ........ 366/173.1, 174.1, 175.2, 181.8, 182.4, 366/182.2, 163.1, 163.2, 167.1, 176.1, 366/337, 181.5; 137/888–896; 239/1–754
See application file for complete search history.

(56) References Cited

U.S. PATENT DOCUMENTS

| | | | | |
|---|---|---|---|---|
| 2,365,293 | A * | 12/1944 | Robinson | B01F 25/50 |
| | | | | 210/194 |
| 2,723,879 | A * | 11/1955 | Martin | B05B 1/3073 |
| | | | | 251/154 |
| 3,101,176 | A * | 8/1963 | Goss | B05B 1/265 |
| | | | | 239/524 |
| 3,756,515 | A * | 9/1973 | Arnold | B05B 1/265 |
| | | | | 239/524 |
| 3,799,508 | A * | 3/1974 | Arnold | B01F 25/20 |
| | | | | 366/175.2 |
| 3,811,620 | A * | 5/1974 | Gebhardt | B05B 5/032 |
| | | | | 239/524 |
| 4,872,833 | A * | 10/1989 | Kramer | B01F 25/3121 |
| | | | | 431/354 |
| 5,338,113 | A * | 8/1994 | Fissenko | B01F 25/311 |
| | | | | 366/178.2 |
| 5,564,825 | A * | 10/1996 | Burt | B01F 23/451 |
| | | | | 239/524 |
| 6,523,991 | B1 * | 2/2003 | Maklad | B01F 25/31242 |
| | | | | 137/890 |
| 6,854,874 | B2 * | 2/2005 | Graham, Sr. | B01F 35/712 |
| | | | | 366/175.2 |
| 7,125,162 | B2 * | 10/2006 | Graham, Sr. | B01F 23/45 |
| | | | | 366/175.2 |
| 7,229,207 | B2 * | 6/2007 | Graham, Sr. | B01F 35/712 |
| | | | | 366/175.2 |
| 10,322,383 | B2 * | 6/2019 | Sprague | B01F 25/25 |
| 2022/0305447 | A1 * | 9/2022 | Glomset | B33Y 10/00 |
| 2023/0173440 | A1 * | 6/2023 | Narabayashi | B01F 25/31242 |
| | | | | 422/122 |

FOREIGN PATENT DOCUMENTS

| | | | |
|---|---|---|---|
| JP | H09-234479 A | 9/1997 | |
| JP | H10-231800 A | 9/1998 | |
| JP | 2005-262200 A | 9/2005 | |
| JP | 2016-083630 A | 5/2016 | |
| JP | 2018-175740 A | 11/2018 | |
| JP | 6748867 B1 * | 9/2020 | .............. G21F 9/02 |
| WO | WO 2019/212028 A1 | 11/2019 | |

OTHER PUBLICATIONS

International Search Report (ISR) (PCT Form PCT/ISA/210), in PCT/JP2021/012811, dated Apr. 20, 2021.

* cited by examiner

MIXING NOZZLE AND CONTAMINATED GAS PURIFICATION DEVICE USING MIXING NOZZLE

TECHNICAL FIELD

The present invention relates to a mixing nozzle and a contaminated gas purification device using the mixing nozzle, and more particularly to a mixing nozzle capable of mixing gas and solution. It also relates to a contaminated gas purification device that uses the mixing nozzle for purifying contaminated gas containing microparticles, which are contaminants, by mixing it with decontamination solution.

BACKGROUND ART

Air purification devices are known to purify bacteria, viruses, radioactive materials, etc. in the air and discharge purified air. For example, the device of Patent Document 1 removes bacteria, viruses, etc. from the air by contacting indoor air with hypochlorous acid water. In this device, the hypochlorous acid water stored in a water reservoir is converted into water droplets, which are mixed with the air drawn in from an air intake port and jetted out from an exhaust port.

CITATION LIST

Patent Document

Patent Document 1: Japanese Patent Application Kokai Publication No. 2018-175740

DISCLOSURE OF THE INVENTION

Problems to be Solved by the Invention

However, in the conventional air purification device as described in Patent Document 1, not all of the air drawn from the air intake port may contact with the hypochlorite water. Furthermore, even if the air completely contacts with the hypochlorite water, when microparticles, which are contaminants contained in the air, exist in the bubbles, the hypochlorite water does not contact with the microparticles surrounded by the bubbles, so that there is a risk that the air is jetted out from the exhaust port without being completely purified.

In view of the above circumstances, the present invention is to provide a contaminated gas purification device capable of certainly purifying contaminated gas by mixing microparticles, which are contaminants contained in the contaminated gas with decontamination solution. The present invention also is to provide a mixing nozzle capable of efficiently mixing gas and solution.

Means for Solving the Problems

To attain the above object of the present invention, a mixing nozzle according to the present invention may include: a throat section which is a small internal cross-sectional area for accelerating mixed flow which is provided by mixing the gas and the solution; a diffuser section whose internal cross-sectional area expands in a flared shape toward a downstream side from the throat section; a gas nozzle section having a gas nozzle tip whose internal cross-sectional area reduces in a tapered shape toward a downstream, arranged at an upstream side of the throat section, and supplied with the gas from outside; a first liquid suction port for liquidly absorbing the solution in the water storage pool from a side of the gas nozzle section toward the gas nozzle tip; a liquid nozzle section extending to the downstream side of the gas nozzle section with intervening the first liquid suction port, and having a liquid nozzle tip whose internal cross-sectional area reduces in a tapered shape toward the downstream; a second liquid suction port for liquidly absorbing the solution in the water storage pool from a side of the liquid nozzle section toward the liquid nozzle tip, arranged at the upstream side of the throat section and the downstream side of the liquid nozzle section; a baffle plate provided such that the gas discharged from the gas nozzle tip is accelerated in the throat section together with the solution liquidly absorbed from the first liquid suction port and the second liquid suction port and that the mixed flow mixed in the diffuser section collides in front of a downstream end of the diffuser section, in which the baffle plate divides and reverses the mixed flow such that high-speed reversed flow of the mixed flow is formed and the gas and the solution are mixed by centrifugal force; and a jetting port in which the mixed flow divided and reversed by the baffle plate jets out in a direction not directly toward an upper direction of the water storage pool.

The baffle plate may have an impact surface for the mixed flow being an arc-shape so as to jet out the mixed flow divided and reversed by the diffuser section obliquely toward a bottom of the water storage pool.

The baffle plate may have a convex jet guide facing the upstream side on an impact surface for the mixed flow so as to guide the mixed flow to the jetting port.

The liquid nozzle tip of the liquid nozzle section may be narrower than the throat section.

The gas nozzle tip of the gas nozzle portion may be narrower than the liquid nozzle tip.

The gas nozzle section may be configured such that the internal cross-sectional area in the direction of its thickness has a flared shape toward the upstream.

A contaminated gas purification device that uses the mixing nozzle according to the present invention, for purifying contaminated gas that is gas from outside containing microparticles, which are contaminants, may include: an intake section having a blower section that intakes contaminated gas containing microparticles, which are contaminants, through an air intake port, and having a blower tube that blows the intake contaminated gas; a water storage pool for storing decontamination solution for decontaminating microparticles, which are contaminants contained in the contaminated gas; and an exhaust section for exhausting the decontaminated gas from the water storage pool, the blower tube of the intake section being connected to the gas nozzle section of the mixing nozzle, the baffle plate dividing and reverting solid-gas-liquid three-phase flow such that high-speed reversed flow of the solid-gas-liquid three-phase flow of the contaminated gas and the decontamination solution mixed in the diffuser section is formed and that the microparticles and the decontamination solution are mixed by separating the microparticles and the gas in the contaminated gas by centrifugal force.

The blower section of the intake section may be disposed at a higher position than the decontamination solution in the water storage pool, and the blower tube may be formed in a U-shape whose folded back portion of the U-shape is disposed at a lower position than the decontamination solution in the water storage pool.

The blower section of the intake section may be disposed at a lower position than the decontamination solution in the water storage pool, and the blower tube may be formed in an inverted U-shape whose folded back portion of the inverted U-shape is disposed at a higher position than the decontamination solution in the water storage pool.

Further, it may include a solution volume control section that controls solution volume of the decontamination solution in the water storage pool.

The exhaust section may have a mist separating section that separates mist generated in the water storage pool into the decontamination solution and the gas, the mist separating section returning the decontamination solution separated to the water storage pool.

The exhaust section may further have an atomizer or a plasma sterilizer for mixing and atomizing the decontamination solution in the water storage pool with gas after decontamination.

The exhaust section may further be connected to another decontaminator.

The another decontaminator may be at least one of a metal fiber filter, a glass fiber filter, an iodine adsorption filter, and a volatile organic compound decomposition catalyst filter.

The decontamination solution in the water storage pool may be constituted by alkaline water, and the another decontaminator may be constituted by a first filter section using metal fibers and a second filter section using iodine adsorbent.

The decontamination solution in the water storage pool may be constituted by hypochlorite water or chlorine dioxide water, and the another decontaminator may be constituted by a first filter section using metal fibers and a second filter section using glass fibers.

The decontamination solution in the water storage pool may be constituted by alkaline water, and the another decontaminator may be constituted by a first filter section using metal fibers and a second filter section using a volatile organic compound decomposition catalyst.

The decontamination solution in the water storage pool may be constituted by alkaline water, and the another decontaminator may be constituted by a first filter section using metal fibers and a second filter section using glass fibers.

The decontamination solution in the water storage pool may be capable of decontaminating at least one of radioactive substances, viruses, bacteria, molds, pollen, photochemical oxidants, and volcanic gases.

The contaminated gas purification device may further be configured to be mountable on a transportation.

The contaminated gas purification device may further be configured to be connectable to a face mask.

Advantageous Effects of the Invention

The contaminated gas purification device according to the present invention has an advantage of being capable of certainly mixing microparticles, which are contaminants contained in contaminated gas with the decontamination solution and purifying. Also, the mixing nozzle according to the present invention has an advantage of being capable of efficiently mixing the gas and the solution.

BEST MODE FOR CARRYING OUT THE INVENTION

Figure 1A:
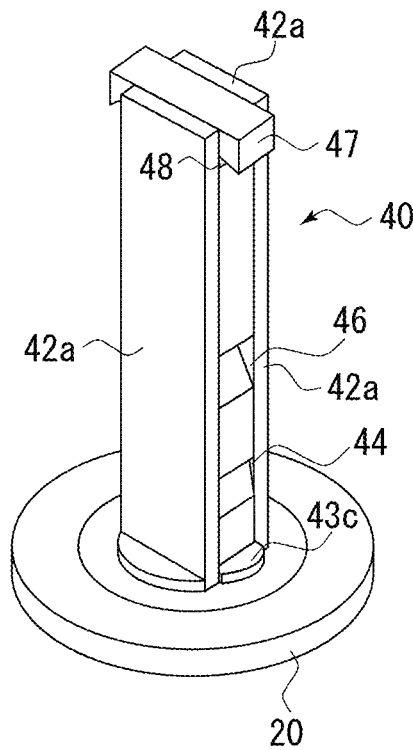
FIGS. 1A-1D are schematic diagrams for explaining in detail a mixing nozzle according to the present invention.
Figure 1B:
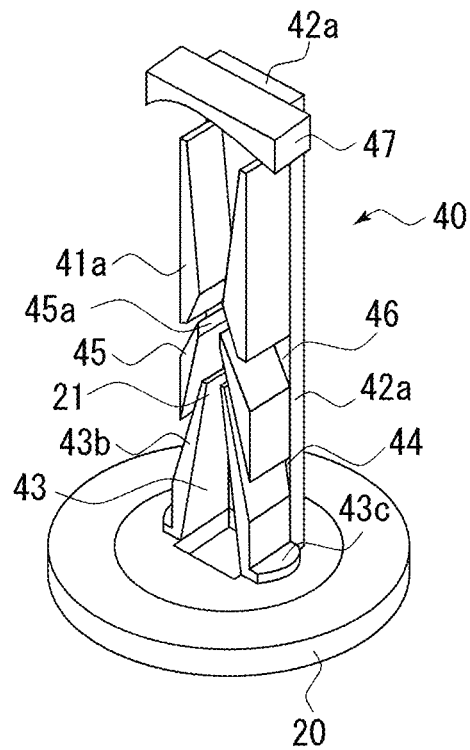

Hereinafter, an embodiment for practicing the present invention will be described with reference to the illustrated examples. A mixing nozzle according to the present invention is immersed in solution stored in a water storage pool, and mixes gas from outside and the solution in the water storage pool from a bottom side of the water storage pool toward an upward direction. Here, when the mixing nozzle according to the present invention is applied to a contaminated gas purification device, the gas from outside is, for example, contaminated gas that contains microparticles, which are contaminants. The solution stored in the water storage pool is, for example, a decontamination solution for decontaminating the microparticles, which are contaminants, contained in the contaminated gas. The mixing nozzle according to the present invention can also be applied to a so-called bioreactor. The bioreactor is a device that performs biochemical reactions using a biocatalyst. In this case, the gas from outside can be such as any atmosphere containing carbon dioxide or methane which are global warming gases, or be oxygen and so on. The solution to be stored in the water storage pool in this case can be any culture solution.

A detail of the mixing nozzle is described below using FIGS. 1A-1D. FIGS. 1A-1D are schematic diagrams for explaining in detail the mixing nozzle according to the present invention, FIG. 1A being a perspective view, FIG. 1B being an exploded perspective view, FIG. 1C being an exploded front view, and FIG. 1D being a side view. In the drawings, the same reference numerals as those in FIGS. 1A-1D denote the same parts. The mixing nozzle 40 is immersed in the decontamination solution in the water storage pool. The mixing nozzle 40 may be provided at a bottom of the water storage pool. The mixing nozzle 40 is used to mix gas from outside and the solution from a bottom side of the water storage pool toward an upward direction. As shown in the drawings, the mixing nozzle 40 has its interior space divided into a throat section 41 and a diffuser section 42. The mixing nozzle 40 further includes a gas nozzle section 43, a first liquid suction port 44, a liquid nozzle section 45, a second liquid suction port 46, a baffle plate 47, and a jetting port 48.

The throat section 41 is a section with a small internal cross-sectional area for accelerating mixed flow which is provided by mixing the gas and the solution. The diffuser section 42 is a section whose internal cross-sectional area expands in a flared shape toward a downstream side from the throat section 41, i.e., upward in the drawings. The throat section 41 and the diffuser section 42 may be constituted by combining two block plates 41a. The block plates 41a may be made of, for example, stainless steel or resin. In the front view of FIG. 1C, the block plate 41a has a shape in which the lower (upstream) side of the throat section 41 is shorter and the upper (downstream) side is longer, and the part of the throat section 41 is the thickest part and the width becomes gradually thinner toward the downstream direction of the diffuser section 42. By arranging two block plates 41a of such shape opposite each other, the throat section 41 and diffuser section 42 are provided in the internal space thereof. The block plates 41a may be fixed by bolts or the like by which the front and back thereof are sandwiched by holding brackets 42a, as shown in the drawing. However, the present invention is not limited to this, and the throat section 41 and the diffuser section 42 may be provided by machining or the like a metal block or a resin block.

The gas nozzle section 43 is arranged at an upstream side of the throat section 41, is supplied with the gas from outside, and has a gas nozzle tip 43a whose internal cross-sectional area reduces in a tapered shape toward a downstream. As shown in the drawing, the gas nozzle tip 43a has a rectangular-shaped jetting port. The gas nozzle section 43 can be made of a nozzle block 43b of, for example, stainless steel, resin or the like. The gas nozzle section 43 has a flange 43c appropriately and may be fixed to a base 20. The base 20 may be fixed to appropriately the bottom of the water pool.

Figure 1C:
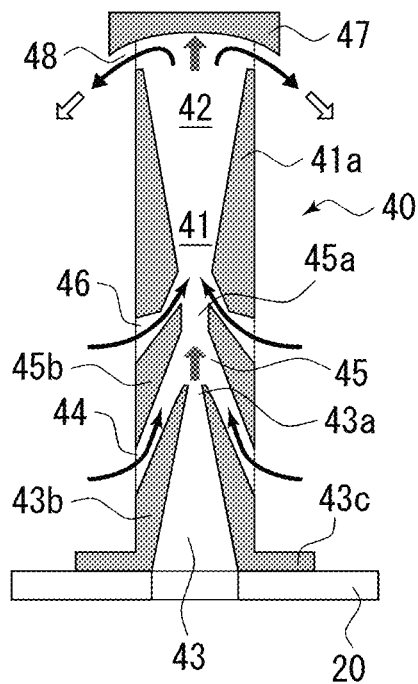
Figure 1D:
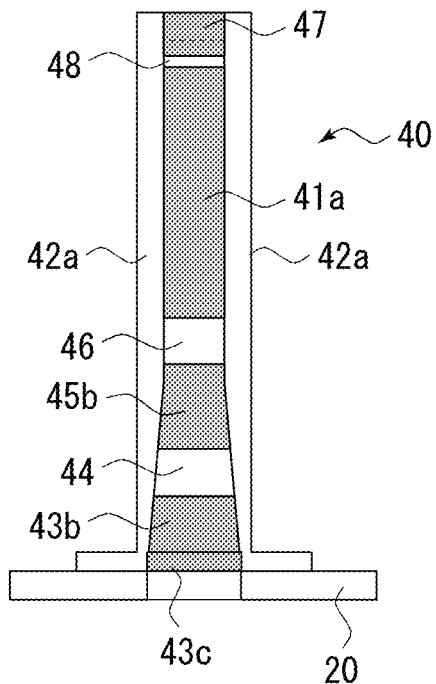

The gas nozzle section 43 may be configured such that the internal cross-sectional area in the direction of its thickness has a flared shape toward the upstream as shown in FIG. 1D. That is, the upstream side is expanded in a flared shape with respect to the thickness direction. This makes it possible to expand a cross-sectional area of a flow path of an inlet side of the gas nozzle.

The gas nozzle section 43 is shown in the illustrated example as an integral part of the mixing nozzle 40. However, the present invention is not limited to this and the gas nozzle section can be configured as a nozzle that is separate from the mixing nozzle 40 and separately fixed to the base 20.

The first liquid suction port 44 liquidly absorbs the solution in the water storage pool from a side of the gas nozzle section 43 toward the gas nozzle tip 43a. That is, the first liquid suction port 44 is provided at an upstream side of a foot of the gas nozzle section 43. At the gas nozzle tip 43a, the solution is liquidly absorbed from the first liquid suction port 44 because the negative pressure generated by the high-speed jet of gas is produced. For example, it may be configured that the solution can flow from the gap for the liquid nozzle section 45 as described later toward a space of a side portion of the gas nozzle section 43. Here, the side portion of the gas nozzle section 43 means the upstream side of the gas nozzle tip 43a of the gas nozzle section 43. As shown in the drawing, the first liquid suction port 44 may be configured such that the solution is liquidly absorbed at an angle obliquely upward in accordance with the tip shape of the gas nozzle section 43.

The liquid nozzle section 45 extends to the downstream side of the gas nozzle section 43 with intervening the first liquid suction port 44, and has a liquid nozzle tip 45a whose internal cross-sectional area reduces in a tapered shape toward the downstream. As shown in the drawing, the liquid nozzle tip 45a has a rectangular-shaped jet flow port. The liquid nozzle section 45 may be made of a tapered block 45b of, for example, stainless steel, resin or the like. The liquid nozzle section 45 has a shape that tapers toward downstream in which the edge of the downstream side of the first liquid suction port 44 is a foot. As shown in FIG. 1C, the liquid nozzle section 45 may be constituted such that, for example, two tapered blocks 45b are arranged opposite with each other and the internal cross-sectional area thereof reduces in a tapered shape. The tapered blocks 45b of the liquid nozzle section 45 may also be fixed by bolts or the like by which the front and back thereof are sandwiched by the holding brackets 42a.

The second liquid suction port 46 is arranged at the upstream side of the throat section 41 and the downstream side of the liquid nozzle section 45, and liquidly absorbs the solution in the water storage pool from a side of the liquid nozzle section 45 toward the liquid nozzle tip 45a. That is, the second liquid suction port 46 is arranged at the upstream side of a foot of the liquid nozzle section 45. The first liquid suction port 44 and the second liquid suction port 46 may be arranged at the upstream side and the downstream side sandwiching the liquid nozzle section 45. At the liquid nozzle tip 45a, the solution is further liquidly absorbed from the second liquid suction port 46 because the negative pressure generated by the high-speed jet of gas and solution is produced. For example, it may be configured that the solution can flow from the gap for the block plate 41a toward a space of a side portion of the liquid nozzle section 45. Here, the side portion of the liquid nozzle section 45 means the upstream side of the liquid nozzle tip 45a of the liquid nozzle section 45. As shown in the drawing, the second liquid suction port 46 may be configured such that the solution is liquidly absorbed at an angle obliquely upward in accordance with the tip shape of the liquid nozzle section 45.

As explained, in the mixing nozzle according to the present invention, the gas nozzle section 43 and the liquid nozzle section 45 are arranged so as to fit with each other via the first liquid suction port 44. Also, the throat section 41 and the liquid nozzle section 45 are arranged so as to fit with each other via the second liquid suction port 46. That is, the flowing to the throat section 41 occurs by the two stages which jetting occurs while the gas from the gas nozzle section 43 and the solution from the first liquid suction port 44 are mixed, and then jetting further occurs from the liquid nozzle section 45 while the solution from the second liquid suction port 46 is added.

Here, specifically, in the liquid nozzle section 45, the liquid nozzle tip 45a is preferably configured to be narrower than the throat section 41 as shown in FIG. 1C. This makes it possible to accelerate the solution liquidly absorbed from the first liquid suction port 44 at a higher speed.

Also, specifically, in the gas nozzle section 43, the gas nozzle tip 43a is preferably configured to be narrower than the liquid nozzle tip 45a as shown in FIG. 1C. This makes it possible to jet the supplied gas from outside at a higher speed. It may be configured that the outer edge of the gas nozzle tip 43a is chamfered or otherwise appropriately to reduce the outlet pressure loss.

Also, the solution liquidly absorbed from the second liquid suction port 46 passes through between the tapered block 45b of the liquid nozzle section 45 and the block plate 41a. In this case, as shown in FIG. 1C, the throat effect may also be obtained at this position by partially narrowing the space between the tapered block 45b and the block plate 41a. This will also allow the solution liquidly absorbed from the second liquid suction port 46 to be accelerated at a higher speed.

The baffle plate 47 is arranged at the downstream edge of the diffuser section 42. First, the gas discharged from the gas nozzle tip 43a is accelerated in the throat section 41 together with the solution liquidly absorbed from the first liquid suction port 44 and the second liquid suction port 46. That is, the solution flows into the diffuser section 42 while being accelerated through the two stages at the first liquid suction port 44 and the second liquid suction port 46. The solution then becomes a mixed flow of the gas and the liquid in the diffuser section 42. The baffle plate 47 may be arranged such that this mixed flow collides in front of the downstream edge of the diffuser section 42. The mixed flow collided on the baffle plate 47 is divided to the left and right and reversed. This results in the formation of a high-speed reversed flow of the mixed flow, and the gas and the solution are mixed by centrifugal force. That is, it is possible to certainly mix the gas and the solution by the centrifugal force through the high-speed reversed flow.

Jetting port 48 is in which the mixed flow divided and reversed by the baffle plate 47 jets out in a direction not directly toward an upper direction of the water storage pool. That is, the mixed flow is jetted out with changing of the direction toward obliquely downward. The mixed flow is jetted out while being subjected to centrifugal force. The jetting port 48 may be provided, for example, by the gap between the tip of the block plate 41a constituting the throat section 41 and the diffuser section 42 and the baffle plate 47.

Here, specifically, the baffle plate 47 preferably has an impact surface for the mixed flow being an arc-shape so as to jet out the mixed flow divided and reversed by the diffuser section 42 obliquely toward the bottom of the water storage pool as shown in FIG. 1C. This results in that the mixed flow efficiently jets obliquely toward the bottom of the water storage pool.

Figure 2:
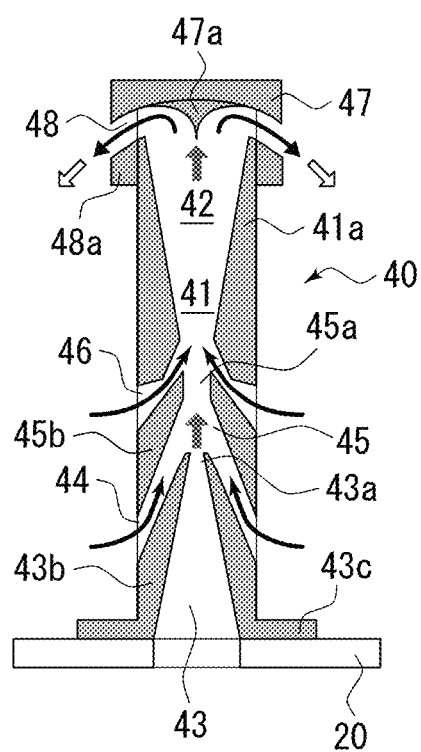
FIG. 2 is a schematic side view for explaining in detail a baffle plate of the mixing nozzle according to the present invention.

In addition, a convex jet guide 47a may be provided, as shown in FIG. 2. FIG. 2 is a schematic side view for explaining in detail the baffle plate of the mixing nozzle of the gas purification device according to the present invention. In the drawing, the same reference numerals as those in FIGS. 1A-1D denote the same parts. As shown in the drawing, the baffle plate 47 has a convex jet guide 47a. The convex jet guide 47a may be arranged such that the convex part faces upstream on the impact surface of the mixed flow so as to guide the mixed flow to the jetting port 48. This results in that the mixed flow can efficiently be divided to the left and right and that the high-speed reversed flow of the mixed flow can more efficiently be formed.

Also, as shown in the drawing, a jetting port guide 48a may be provided to strengthen the jetting port 48. The jetting port guide 48a allows the mixed flow jetted from the jetting port 48 to more efficiently jet out obliquely toward the bottom of the water storage pool.

The mixing nozzle according to the present invention as structured above can efficiently mix the gas and the solution.

Also, the mixing nozzle according to the present invention can also be applied to a so-called bioreactor, for example. The bioreactor is a device that performs biochemical reactions using a biocatalyst. That is, a culture solution is used instead of a decontamination solution, and gas containing in high concentration carbon dioxide or methane, which is global warming gas, is used instead of contaminated gas. By ventilating these gases into the culture solution with the mixing nozzle according to the present invention, these gases or the oxygen needed by the cells can be agitated into microbubbles, which can be supplied efficiently. Since this enables the reduction of carbon dioxide to oxygen and organic matter through photosynthesis by microorganisms and algae, or the conversion of methane to methanol by microorganisms, it is possible to reduce global warming gas in the atmosphere on an industrial scale.

Figure 3:
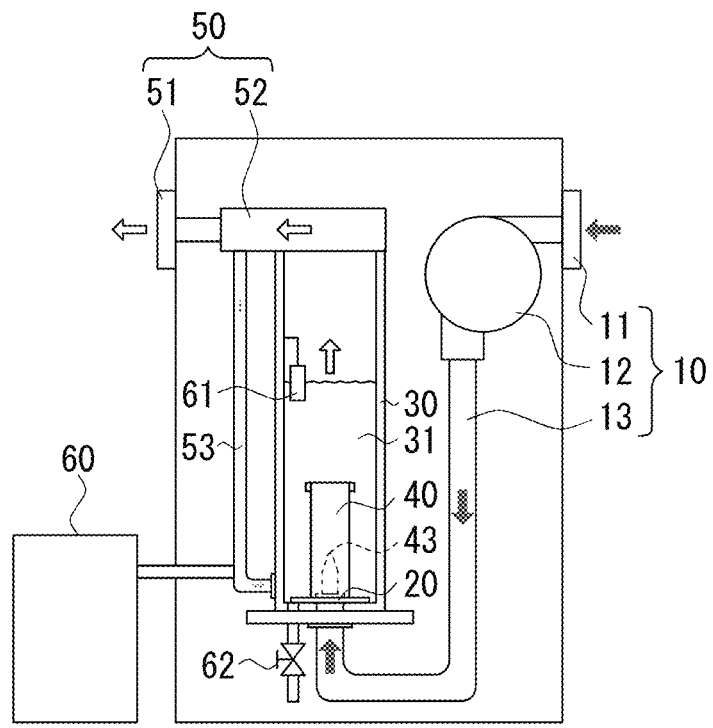
FIG. 3 is a schematic configuration diagram for explaining a contaminated gas purification device according to the present invention.

Next, a contaminated gas purification device that uses the mixing nozzle according to the present invention described above for purifying contaminated gas that is gas from outside containing microparticles, which are contaminants, will be described. FIG. 3 is a schematic configuration diagram for explaining a contaminated gas purification device according to the present invention. In the drawing, the same reference numerals as those in FIGS. 1A-1D denote the same parts. As shown in the drawing, the contaminated gas purification device according to the present invention mainly is constituted by an intake section 10, a water storage pool 30, a mixing nozzle 40, and an exhaust section 50. In the mixing nozzle 40 described above, what is described as the gas from outside is in this example the contaminated gas containing microparticles, which are contaminants. Also, what is described as the solution stored in the water storage pool is in this example decontamination solution for decontaminating the microparticles, which are contaminants contained in the contaminated gas.

The intake section 10 is constituted by a blower section 12 and a blower tube 13, that intakes from an air intake port 11. The blower section 12 intakes the contaminated gas containing microparticles, which are contaminants, from the air intake port 11. The blower tube 13 blows the intake contaminated gas toward the water storage pool 30 side, which will be described later. The blower section 12 may use, for example, such a blower as a sirocco fan using an impeller. The blower tube 13 may be formed, for example, in a U-shape as shown in the drawing. As shown in the illustrated example, when the blower section 12 of the intake section 10 is disposed at a higher position than the decontamination solution 31 in the water storage pool 30 as described later, it is possible to prevent the blower section 12 from becoming submerged even if the decontamination solution 31 in the water storage pool 30 flows back.

The blower tube 13 of the intake section 10 is then connected to the gas nozzle section 43 of the mixing nozzle 40. For example, the blower tube 13 has a flange appropriately and may be fixed to the base 20.

The water storage pool 30 stores the decontamination solution 31. The decontamination solution 31 is for being mixed with the contaminated gas and decontaminating microparticles contained in the contaminated gas. The decontamination solution 31 is so-called scrubber water. The decontamination solution 31 may be capable of decontaminating at least one of radioactive substances, viruses, bacteria, molds, pollen, photochemical oxidants, and volcanic gases, for example. Specifically, the decontamination solution 31 may be, for example, hypochlorite water or chlorine dioxide water, which is effective in decontaminating microparticles such as viruses. It may also be alkaline water such as sodium hydroxide solution, which is effective in removing radioactive substances or decomposing volatile organic compounds.

Here, the baffle plate 47 of the mixing nozzle 40 described above, which is shown in detail in FIGS. 1A-1D, etc., divides and reverses solid-gas-liquid three-phase flow such that high-speed reversed flow of the solid-gas-liquid three-phase flow of the contaminated gas and the decontamination solution mixed in the diffuser section 42 is formed and that the microparticles and the decontamination solution are mixed by separating the microparticles and the gas in the contaminated gas by centrifugal force. That is, the decontamination effect of the decontamination solution cannot be obtained since the microparticles contained in the bubbles is not directly contacted with the decontamination solution, however, in the mixing nozzle 40 of the contaminated gas purification device according to the present invention, it is possible to certainly mix the microparticles and the decontamination solution by separating the microparticles and the gas in the contaminated gas by centrifugal force.

The decontaminated gas discharged into the water storage pool 30 using the mixing nozzle 40 according to the present invention may be exhausted from the exhaust section 50. The decontaminated gas discharged into the water storage pool 30 becomes bubbles in the decontamination solution 31 of the water storage pool 30 and is released from the decontaminated solution 31. The released gas may be exhausted from the exhaust section 50.

The exhaust section 50 may be constituted by, for example, an exhaust port 51 and a mist separating section 52. The mist separating section 52 separates mist generated in the water storage pool 30 into the decontamination solution 31 and the gas. This is because not only the gas after decontamination flies up on the decontamination solution 31, but also the decontamination solution 31 becomes mist and flies up. The mist may be exhausted from the exhaust port 51 as it is, or it may be separated into the decontamination solution 31 and the gas using the mist separating section 52, and only the gas after decontamination may be exhausted.

The mist separating section 52 may also return the separated decontamination solution to the water storage pool 30. For example, the decontamination solution separated by the mist separating section 52 is returned to the water storage pool 30 using the separated water collection pipe 53. This also allows the decontamination solution to be reused.

Furthermore, the contaminated gas purification device according to the present invention may be configured to have a solution volume control section 60. The solution volume control section 60 controls solution volume of the decontamination solution 31 in the water storage pool 30. The solution volume control section 60 measures changes of the water level of the decontamination solution 31 using, for example, a float 61 which measures the water level of the decontamination solution 31 in the water storage pool 30, and when the water level drops below a predetermined level, the decontamination solution 31 may be replenished from a storage tank or the like. Also, if necessary, a drain valve 62 may be configured to be installed at the bottom of the water storage pool 30 to let the decontamination solution 31 out of the water storage pool 30.

The exhaust section 50 may also have an atomizer to mix and atomize the decontamination solution 31 in the water storage pool 30 with the gas after decontamination. The atomizer may use, for example, an ultrasonic atomizer. By exhausting the decontamination solution atomized by the atomizer from the exhaust port 51, it is also possible to fill the space with the decontamination solution.

Furthermore, the exhaust section 50 may have a plasma sterilizer. Thus, the contaminated gas purification device according to the present invention can exhaust the decontaminated gas by providing with various functions to the exhaust section 50. In addition, a pressure sensor or the like may be provided as appropriate to monitor the exhaust.

Figure 4:
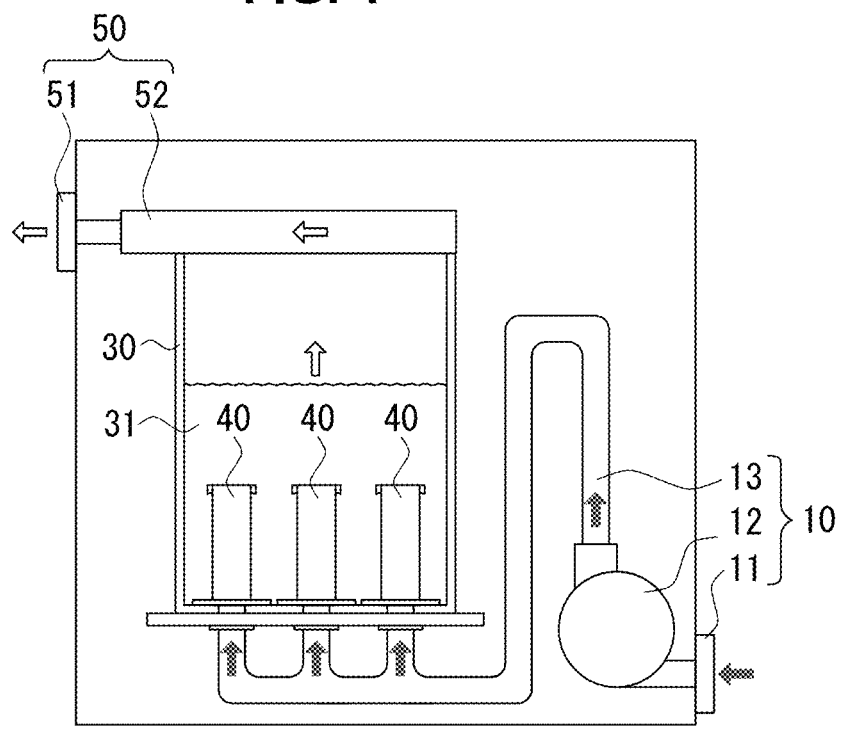
FIG. 4 is a schematic diagram for explaining another layout of the intake section of the contaminated gas purification device according to the present invention.

Another layout of the intake section of the contaminated gas purification device according to the present invention is explained using FIG. 4. FIG. 4 is a schematic diagram for explaining another layout of the intake section of the contaminated gas purification device according to the present invention. In the drawing, the same reference numerals as those in FIGS. 1 and 3 denote the same parts. In the illustrated example, an example in which a plurality of mixing nozzles 40 of the present invention are arranged is shown. This can increase the purification efficiency of the contaminated gas. As shown in the drawing, in this example, the blower section 12 of the intake section 10 is disposed at a lower position than the decontamination solution 31 of the water storage pool 30. This is because the blower section 12 is generally heavy and may be more stable when placed at the bottom. In this case, the blower tube 13 may be formed in, for example, an inverted U-shape as shown in the drawing. When the blower section 12 is disposed at a lower position than the decontamination solution 31 in the water storage pool 30 as shown in the drawing, the inverted U-shaped folded portion may be configured to be disposed at a higher position than the decontamination solution 31 in the water storage pool 30. It is possible to prevent the blower section 12 from becoming submerged even if the decontamination solution 31 in the water storage pool 30 flows back.

Figure 5:
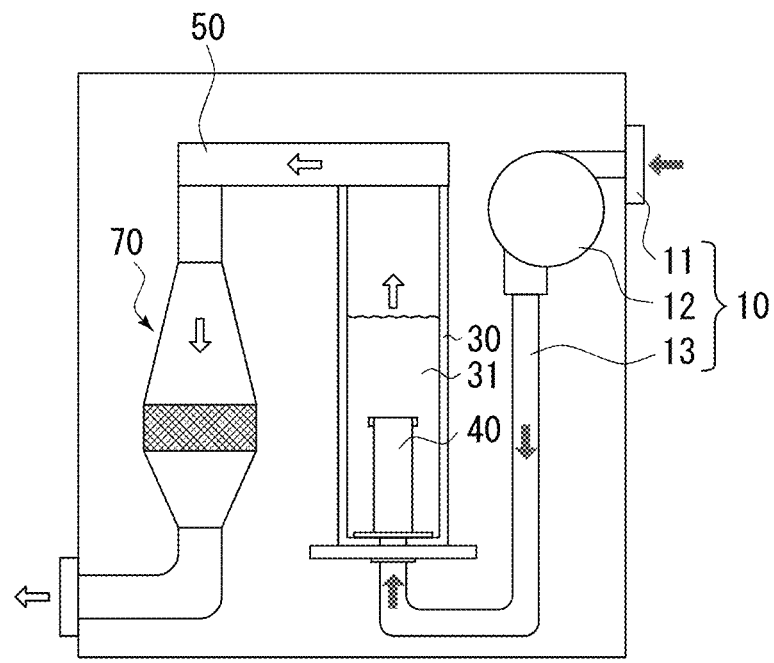
FIG. 5 is a schematic diagram for explaining an application example of the contaminated gas purification device according to the present invention.

Next, an application example of the contaminated gas purification device according to the present invention is described. FIG. 5 is a schematic diagram for explaining an application example of the contaminated gas purification device according to the present invention. In the drawing, the same reference numerals as those in FIG. 3 denote the same parts. As shown in the drawing, in the contaminated gas purification device according to the present invention, another decontaminator 70 can be further connected to the exhaust section 50. The another decontaminator 70 may be, for example, a metal fiber filter, a glass fiber filter, an iodine adsorption filter, a volatile organic compound decomposition catalyst filter, etc. The metal fiber filter is resistant to high temperature and does not pose a fire hazard. It also has the advantage of being less prone to clogging. A combination of several such dry filters may be used. The another decontaminator 70 may appropriately be selected depending on the contaminant to be decontaminated. That is, it may be appropriately selected according to a kind of the decontamination solution 31 in the water storage pool 30.

Specifically, when the contaminant to be decontaminated is, for example, a radioactive material, alkaline water such as sodium hydroxide solution is selected as the decontamination solution 31 in the water storage pool 30. At this stage, the radioactive material is first decontaminated. Then, a two-stage filter is used as the another decontaminator 70. That is, the decontaminator 70 may use one having a first filter section using metal fibers and a second filter section using iodine adsorbent material. The iodine adsorbent is, for example, silver zeolite (AgX). The first filter section removes water droplets or particulates from the decontamination solution 31. The second filter section performs adsorption and removal of radioactive iodine. Thus, by performing decontamination in multiple stages, the contaminants that could not be removed in the water storage pool 30 can be certainly removed. Such contaminated gas purification device according to the present invention can be used to directly be connected to an exhaust port of a containment vessel when venting a nuclear power generator, for example.

Also, when the contaminant to be decontaminated is, for example, a virus, hypochlorite or chlorine dioxide water is selected as the decontamination solution 31 in the water storage pool 30. At this stage, the virus is first sterilized. Then, a two-stage filter is used as the another decontaminator 70. That is, the decontaminator 70 may use one having a first filter section using metal fibers and a second filter section using glass fibers. The glass fiber of the second filter section is, for example, a HEPA filter (High Efficiency Particulate Air Filter). The first filter section removes water droplets and microparticles from the decontamination solution 31. The second filter section removes microparticles. The contaminated gas purification device according to the present invention can be used to directly be connected to an air conditioning system in a hospital, for example.

Also, when the contaminant to be decontaminated is, for example, photochemical smog, alkaline water such as sodium hydroxide solution is selected as the decontamination solution 31 in the water storage pool 30. At this stage, neutralization and removal of sulfuric acid compounds ($SO_x$) and nitrogen oxides ($NO_x$) are first performed. Then, a two-stage filter is used as the another decontaminator 70. That is, the decontaminator 70 may use one having a first filter section using metal fibers and a second filter section using a volatile organic compound decomposition catalyst (VOC catalyst). The first filter section removes water droplets and microparticles from the decontamination solution 31. The second filter section decomposes and removes volatile organic compound by catalytic reaction.

Further, when the contaminant to be decontaminated is, for example, volcanic gas, alkaline water such as sodium hydroxide solution is selected as the decontamination solution 31 in the water storage pool 30. At this stage, neutralization removal of hydrogen sulfide and other contaminants is first performed. Then, a two-stage filter is used as the another decontaminator 70. That is, the decontaminator 70 may use one having a first filter section using metal fibers and a second filter section using glass fibers. The glass fiber is, for example, a HEPA filter. The first filter section removes water droplets from the decontamination solution 31 and microparticles such as volcanic ash. The second filter section further removes microparticles such as volcanic ash.

Thus, the contaminated gas purification device according to the present invention ensures that microparticles, which are contaminants contained in contaminated gas, are certainly mixed with the decontamination solution and purified, and furthermore, by combining conventional decontaminator, contaminants that could not be removed by the decontamination solution can be more certainly removed.

Next, the effectiveness of the contaminated gas purification device according to the present invention is explained. A decontamination factor (DF) of the contaminated gas purification device according to the present invention and that using a mixing nozzle of another structure are compared. Here, the decontamination factor is defined as DF= (Input powder volume)/(Output powder volume). That is, the higher the decontamination effect, the higher the DF value.

Figure 6:
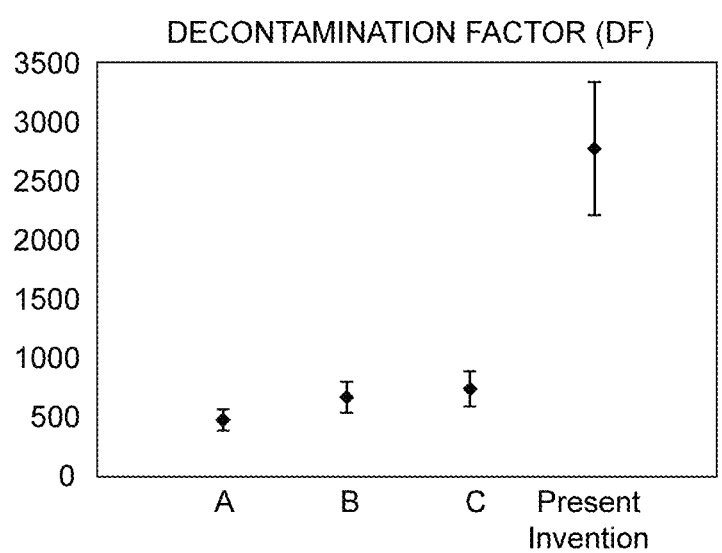
FIG. 6 is a comparison graph of decontamination factors between the contaminated gas purification device according to the present invention and comparative examples.

FIG. 6 is a comparison graph of decontamination factors between the contaminated gas purification device according to the present invention and comparative examples. The mixing nozzles used as comparative examples are the following.

Comparative Example A: only a gas nozzle connected to the intake section without a mixing nozzle Comparative Example B: a baffle plate is provided with Comparative Example A Comparative Example C: a liquid nozzle section and a second liquid suction port are provided with Comparative Example B (without a first liquid suction port)

Further, a simulated substance of a radioactive material are used as a contaminant. Specifically, barium sulfate is used as the simulated substance.

First, in Comparative Example A, because the bubbles directly rise, the water surface of the decontamination solution 31 in the water storage pool 30 oscillated significantly, and the highest point of arrival of the water droplets is accordingly higher. This resulted in the smallest DF. It is understood when the baffle plate is provided as in Comparative Example B, the oscillation of the water surface is suppressed and the scattering of water droplets is controlled, resulting in a slightly larger DF. Furthermore, it is understood when one stage of the liquid suction port is provided as in Comparative Example C, resulting in a slightly larger DF.

Compared to these comparative examples, as shown in the drawing, the DF is dramatically larger when the two-stage configuration of the first suction port and the second suction port is used as in the present invention. Thus, it can be seen that the mixing nozzle of the contaminated gas purification device according to the present invention is a very effective structure for the decontamination function in the contaminated gas purification device. It is also possible to use the mixing nozzle described in the present invention in the mixing section of a general wet-type contaminated gas purification device.

Figure 7:
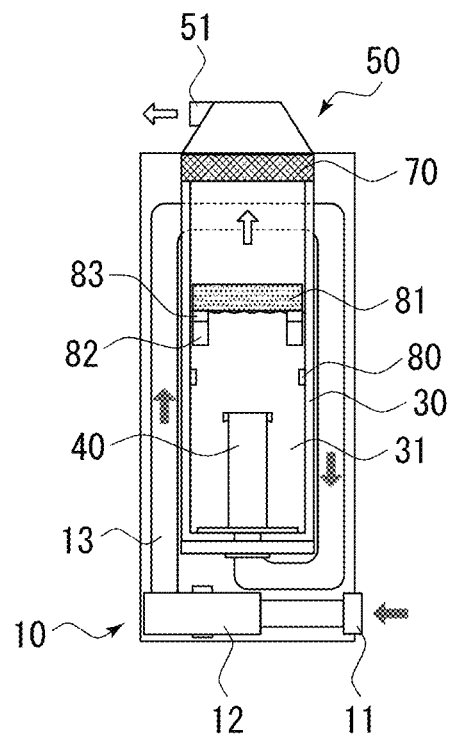
FIG. 7 is a schematic configuration diagram for explaining another application example of the contaminated gas purification device according to the present invention.

FIG. 7 is a schematic configuration diagram for explaining another application example of the contaminated gas purification device according to the present invention. In the drawing, the same reference numerals as those in FIG. 5 denote the same parts. As shown in the drawing, this example is an integrated contaminated gas purification device. The basic configuration is the same as the example shown in FIG. 5. The integrated contaminated gas purification device of FIG. 7 has, for example, a water level lower limit sensor 80. When the water level drops below a predetermined level, a warning or the like should be issued, and the decontamination solution 31 may be added as needed. A wave absorber 81 may also be provided. The wave absorber 81 is, for example, a cage-shaped perforated metal plate. The wave absorber 81 may be configured to be positioned above the water surface using a float 82. Furthermore, an ultrasonic transducer 83 may be used to spray the decontamination solution 31. The ultrasonic transducer 83 can generate a fine mist or plasmarize with strong ultrasonic waves. The ultrasonic transducer 83 is best placed at a depth of a few centimeters below the water surface. Thus, as shown in the drawing, the ultrasonic transducer 83 may be arranged, for example, above the float 82 and below the wave absorber 81. This allows the ultrasonic transducer 83 to always vibrate at a depth of several centimeters below the water surface. If necessary, the another decontaminator 70 may be provided, and finally the decontaminated gas may be exhausted from the exhaust port 51 of the exhaust section 50. Such an integrated contaminated gas purification device can be installed in, for example, a hospital examination room, a waiting room, a restaurant, various windows, etc., in the same way as a general air purifier.

The contaminated gas purification device according to the present invention may also be configured to be connected to a face mask. The face mask is a sealed object, such as a protective mask, to which a tube or the like is connected, and is connected to the exhaust port 51 of the contaminated gas purification device. This allows the gas after decontamination to be supplied directly into the face mask.

Figure 8:
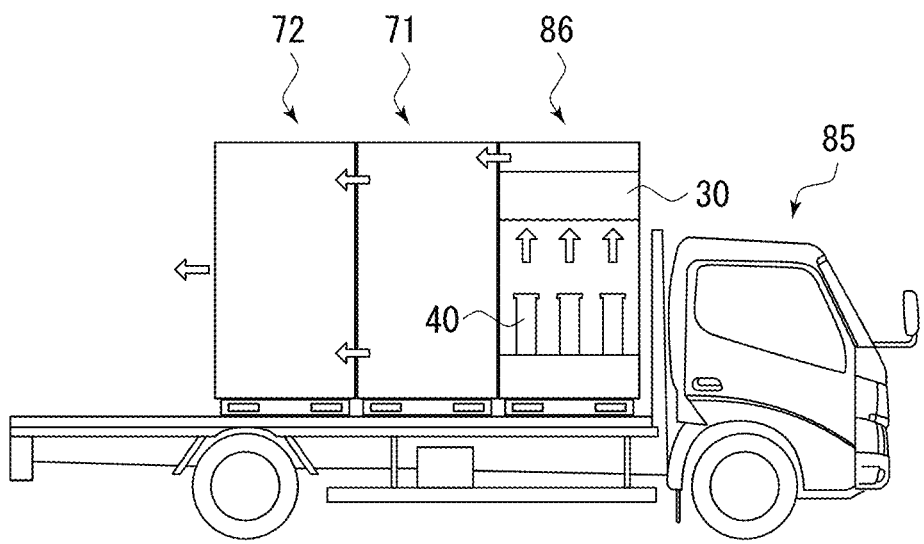
FIG. 8 is a schematic configuration diagram for explaining an example in which the contaminated gas purification device according to the present invention is configured to be movable.

Further, the contaminated gas purification device according to the present invention may be configured to be mountable on a transportation. For example, it can be mounted on a transportation such as a truck, etc., to perform purification work of contaminated gases while moving in a contaminated area. FIG. 8 is a schematic configuration diagram for explaining an example in which the contaminated gas purification device according to the present invention is configured to be movable. In the drawing, the same reference numerals as those in FIG. 3 denote the same parts. As shown in the drawing, the contaminated gas purification device according to the present invention can be modularized and loaded on a truck 85. In the illustrated example, the module 86 is a modularized version of the basic form of the contaminated gas purification device according to the present invention as shown, for example, in FIG. 3. As another decontaminator, a two-stage configuration, in which a modularized first filter section 71 and a second filter section 72 are connected and loaded is shown. These can be any of the dry filters described above. This modular configuration makes it possible to perform purification work while loaded on a truck 85. In addition, each module can be sized to be transportable by trailer, helicopter, airplane or the like.

The contaminated gas purification device according to the present invention is not limited to the above-described illustrated examples and may be variously modified without departing from the spirit and scope of the invention.

REFERENCE SIGNS LIST

- 10: Intake section
- 11: Air intake port
- 12: Blower section
- 13: Blower tube
- 20: Base
- 30: Water storage pool
- 31: Decontamination solution
- 40: Mixing nozzle
- 41: Throat section
- 41a: Block plate
- 42: Diffuser section
- 42a: Holding bracket
- 43: Gas nozzle section
- 43a: Gas nozzle tip
- 43b: Nozzle block
- 43c: Flange
- 44: First liquid suction port
- 45: Liquid nozzle section
- 45a: Liquid nozzle tip
- 45b: Tapered block
- 46: Second liquid suction port
- 47: Baffle plate
- 47a: Convex jet guide
- 48: Jetting port
- 48a: Jetting port guide
- 50: Exhaust section
- 51: Exhaust port
- 52: Mist separating section
- 53: Separated water collection pipe
- 60: Solution volume control section
- 61: Float
- 62: Drain valve
- 70: Another decontaminator
- 71: First filter section
- 72: Second filter section
- 80: Water level lower limit sensor
- 81: Wave absorber
- 82: Float
- 83: Ultrasonic transducer
- 85: Truck
- 86: Module

The invention claimed is:

1. A mixing nozzle immersed in solution stored in a water storage pool, and mixing gas from outside and the solution in the water storage pool from a bottom side of the water storage pool toward an upward direction, the mixing nozzle comprising:
    a throat section which includes an internal cross-sectional area for accelerating mixed flow which is provided by mixing the gas and the solution;
    a diffuser section whose internal cross-sectional area expands in a flared shape toward a downstream side from the throat section;
    a gas nozzle section having a gas nozzle tip whose internal cross-sectional area reduces in a tapered shape toward the downstream side, arranged at an upstream side of the throat section, and supplied with the gas from the outside;
    a first liquid suction port for liquidly absorbing the solution in the water storage pool from a side of the gas nozzle section toward the gas nozzle tip;
    a liquid nozzle section extending to the downstream side of the gas nozzle section with intervening the first liquid suction port, and having a liquid nozzle tip whose internal cross-sectional area reduces in a tapered shape toward the downstream side;
    a second liquid suction port for liquidly absorbing the solution in the water storage pool from a side of the liquid nozzle section toward the liquid nozzle tip, arranged at the upstream side of the throat section and the downstream side of the liquid nozzle section;
    a baffle plate arranged at a downstream end of the diffuser section and provided such that the gas discharged from the gas nozzle tip is accelerated in the throat section together with the solution liquidly absorbed from the first liquid suction port and the second liquid suction port and that the mixed flow mixed in the diffuser section collides in front of the downstream end of the diffuser section, in which the baffle plate divides and reverses the mixed flow such that high-speed reversed flow of the mixed flow is formed and the gas and the solution are mixed by centrifugal force; and
    a jetting port in which the mixed flow divided and reversed by the baffle plate jets out in a direction not directly toward an upper direction of the water storage pool.

2. The mixing nozzle according to claim 1, wherein the baffle plate has an impact surface for the mixed flow being an arc-shape so as to jet out the mixed flow divided and reversed by the diffuser section obliquely toward a bottom of the water storage pool.

3. The mixing nozzle according to claim 1, wherein the baffle plate has a convex jet guide facing the upstream side of the mixing nozzle on an impact surface for the mixed flow so as to guide the mixed flow to the jetting port.

4. The mixing nozzle according to claim 1, wherein the liquid nozzle tip of the liquid nozzle section is narrower in cross-section perpendicular to the upward direction than that of the throat section.

5. The mixing nozzle according to claim 1, wherein the gas nozzle tip of the gas nozzle portion is narrower in cross-section perpendicular to the upward direction than that of the liquid nozzle tip.

6. The mixing nozzle according to claim 1, wherein the gas nozzle section is configured such that the internal cross-sectional area in a side sectional direction of a thickness of the gas nozzle section has a flared shape toward the upstream.

7. A contaminated gas purification device that uses the mixing nozzle according to claim 1, for purifying contaminated gas that is gas from the outside containing microparticles, which are contaminants, the contaminated gas purification device comprising:
- an intake section having a blower section that intakes the contaminated gas containing microparticles, which are contaminants, through an air intake port, and having a blower tube that blows the intake contaminated gas;
- a water storage pool for storing decontamination solution for decontaminating microparticles, which are contaminants contained in the contaminated gas; and
- an exhaust section for exhausting the decontaminated gas from the water storage pool,
- the blower tube of the intake section being connected to the gas nozzle section of the mixing nozzle,
- the baffle plate dividing and reversing solid-gas-liquid three-phase flow such that high-speed reversed flow of the solid-gas-liquid three-phase flow of the contaminated gas and the decontamination solution mixed in the diffuser section is formed and that the microparticles and the decontamination solution are mixed by separating the microparticles and the gas in the contaminated gas by centrifugal force.

8. The contaminated gas purification device according to claim 7, wherein the blower section of the intake section is disposed at a higher position than the decontamination solution in the water storage pool, and the blower tube is formed in a U-shape whose folded back portion of the U-shape is disposed at a lower position than the decontamination solution in the water storage pool.

9. The contaminated gas purification device according to claim 7, wherein the blower section of the intake section is disposed at a lower position than the decontamination solution in the water storage pool, and the blower tube is formed in an inverted U-shape whose folded back portion of the inverted U-shape is disposed at a higher position than the decontamination solution in the water storage pool.

10. The contaminated gas purification device according to claim 7, further comprising a solution volume control section that controls solution volume of the decontamination solution in the water storage pool.

11. The contaminated gas purification device according to claim 7, wherein the exhaust section has a mist separating section that separates mist generated in the water storage pool into the decontamination solution and the gas, the mist separating section returning the decontamination solution separated to the water storage pool.

12. The contaminated gas purification device according to claim 7, wherein the exhaust section further has an atomizer or a plasma sterilizer for mixing and atomizing the decontamination solution in the water storage pool with gas after decontamination.

13. The contaminated gas purification device according to claim 7, wherein the exhaust section is further connected to a decontaminator.

14. The contaminated gas purification device according to claim 13, wherein the decontaminator is at least one of a metal fiber filter, a glass fiber filter, an iodine adsorption filter, and a volatile organic compound decomposition catalyst filter.

15. The contaminated gas purification device according to claim 13, wherein
- the decontamination solution in the water storage pool is constituted by alkaline water,
- the decontaminator is constituted by a first filter section using metal fibers and a second filter section using iodine adsorbent.

16. The contaminated gas purification device according to claim 13, wherein
- the decontamination solution in the water storage pool is constituted by hypochlorite water or chlorine dioxide water,
- the decontaminator is constituted by a first filter section using metal fibers and a second filter section using glass fibers.

17. The contaminated gas purification device according to claim 13, wherein
- the decontamination solution in the water storage pool is constituted by alkaline water,
- the decontaminator is constituted by a first filter section using metal fibers and a second filter section using a volatile organic compound decomposition catalyst.

18. The contaminated gas purification device according to claim 13, wherein
- the decontamination solution in the water storage pool is constituted by alkaline water,
- the decontaminator is constituted by a first filter section using metal fibers and a second filter section using glass fibers.

19. The contaminated gas purification device according to claim 7, wherein the decontamination solution in the water storage pool is capable of decontaminating at least one of radioactive substances, viruses, bacteria, molds, pollen, photochemical oxidants, and volcanic gases.

20. The contaminated gas purification device according to claim 7, which further is configured to be mountable on a transportation.

21. The contaminated gas purification device according to claim 7, which further is configured to be connectable to a face mask.

* * * * *